US007416292B2

(12) United States Patent
Leighton

(10) Patent No.: US 7,416,292 B2
(45) Date of Patent: Aug. 26, 2008

(54) VALVE SYSTEM FOR MOLTEN SOLID INK AND METHOD FOR REGULATING FLOW OF MOLTEN SOLID INK

(75) Inventor: Roger Leighton, Rochester, NY (US)

(73) Assignee: Xerox Corporation, Norwalk, CT (US)

(*) Notice: Subject to any disclaimer, the term of this patent is extended or adjusted under 35 U.S.C. 154(b) by 381 days.

(21) Appl. No.: 11/169,753

(22) Filed: Jun. 30, 2005

(65) Prior Publication Data

US 2007/0002107 A1 Jan. 4, 2007

(51) Int. Cl.
*B41J 2/175* (2006.01)
*G01D 11/00* (2006.01)

(52) U.S. Cl. .......................................... 347/88; 347/99

(58) Field of Classification Search .................. 347/88, 347/99, 84, 85, 95
See application file for complete search history.

(56) References Cited

U.S. PATENT DOCUMENTS

| | | | | |
|---|---|---|---|---|
| 5,372,852 | A | 12/1994 | Titterington et al. | |
| 5,489,925 | A * | 2/1996 | Brooks et al. | 347/6 |
| 5,592,202 | A * | 1/1997 | Erickson | 347/37 |
| 5,821,963 | A | 10/1998 | Sutera et al. | |
| 6,428,156 | B1 * | 8/2002 | Waller et al. | 347/89 |
| 6,450,601 | B1 * | 9/2002 | Pagnon et al. | 347/7 |
| 6,513,910 | B2 * | 2/2003 | Naniwa et al. | 347/55 |
| 6,746,113 | B1 | 6/2004 | Leighton et al. | |
| 6,764,160 | B1 | 7/2004 | Phillips et al. | |
| 6,783,217 | B2 * | 8/2004 | Silverbrook | 347/85 |
| 6,799,844 | B2 * | 10/2004 | Leighton et al. | 347/86 |
| 6,825,557 | B2 * | 11/2004 | DiBattista et al. | 257/712 |
| 6,866,375 | B2 | 3/2005 | Phillips et al. | |
| 6,945,638 | B2 * | 9/2005 | Teung et al. | 347/74 |
| 2003/0095167 | A1 * | 5/2003 | Jameson et al. | 347/85 |
| 2004/0114010 | A1 | 6/2004 | Leighton et al. | |
| 2005/0034658 | A1 | 2/2005 | Palifka et al. | |

FOREIGN PATENT DOCUMENTS

| | | | |
|---|---|---|---|
| EP | 0 777 008 | A1 | 6/1997 |
| EP | 1 431 041 | A1 | 6/2004 |
| GB | 2 360 741 | A | 10/2001 |

* cited by examiner

*Primary Examiner*—Stephen D Meier
*Assistant Examiner*—Leonard S Liang
(74) *Attorney, Agent, or Firm*—Oliff & Berridge, PLC

(57) ABSTRACT

In a phase-change ink image producing machine, better control flow of molten solid ink may be provided by a solid ink valve system including a valve plate with one or more valve ports, an umbilical connector, and a valve positioned between the valve plate and the umbilical connector. Ink flow between the valve plate and the umbilical connector may be asynchronously regulated by actuating the valve. Such actuation may be performed by heating and cooling the valve, by applying electric current to a coil that surrounds a valve element of the valve and to a wire provided in the valve element and/or by asynchronously actuating a valve associated with the valve port.

11 Claims, 14 Drawing Sheets

VALVE SYSTEM FOR MOLTEN SOLID INK AND METHOD FOR REGULATING FLOW OF MOLTEN SOLID INK

BACKGROUND

Phase-change ink image producing machines or printers employ phase-change inks that are in the solid phase at ambient temperature, but exist in the molten or melted liquid phase at the elevated operating temperature of the machine or printer. At such an elevated operating temperature, droplets or jets of the molten or liquid phase change ink are ejected from a printhead device of the printer onto a printing media. Such ejection can be directly onto a final image receiving substrate, or indirectly onto an imaging member before transfer from it to the final image receiving media. When the ink droplets contact the surface of the printing media, the droplets quickly solidify to create an image in the form of a predetermined pattern of solidified ink drops.

An example of such a phase change ink image producing machine or printer, and the process for producing images therewith onto image receiving sheets is disclosed in U.S. Pat. No. 5,372,852.

SUMMARY

Better control flow of molten solid ink may be provided by a solid ink valve system that may include a valve plate with one or more valve port, an umbilical connector, and a valve positioned between the valve plate and the umbilical connector and connected to the at least one valve port. Ink flow between the valve plate and the umbilical connector may be asynchronously regulated by actuating the valve.

The valve may be actuated by heating and cooling the valve, by applying electric current to a coil that surrounds a valve element of the valve and to a wire provided in the valve element for heating solid ink, or by asynchronously actuating a valve mechanism that is associated with the valve port.

These and other features and advantages are described in or are apparent from the following detailed description of various exemplary embodiments.

BRIEF DESCRIPTION OF THE DRAWINGS

Exemplary embodiments are described in detail, with reference to the following figures in which like reference numerals refer to like elements, and wherein.

DETAILED DESCRIPTION OF EMBODIMENTS

The following detailed description describes exemplary embodiments of apparatus, methods and systems for asynchronously regulating flow of molten solid ink. For the sake of clarity and familiarity, specific examples of electrical and/or mechanical devices are provided. However, it should be appreciated that the details and principles described herein may be equally applied to other electrical and/mechanical devices as well.

Figure 1:
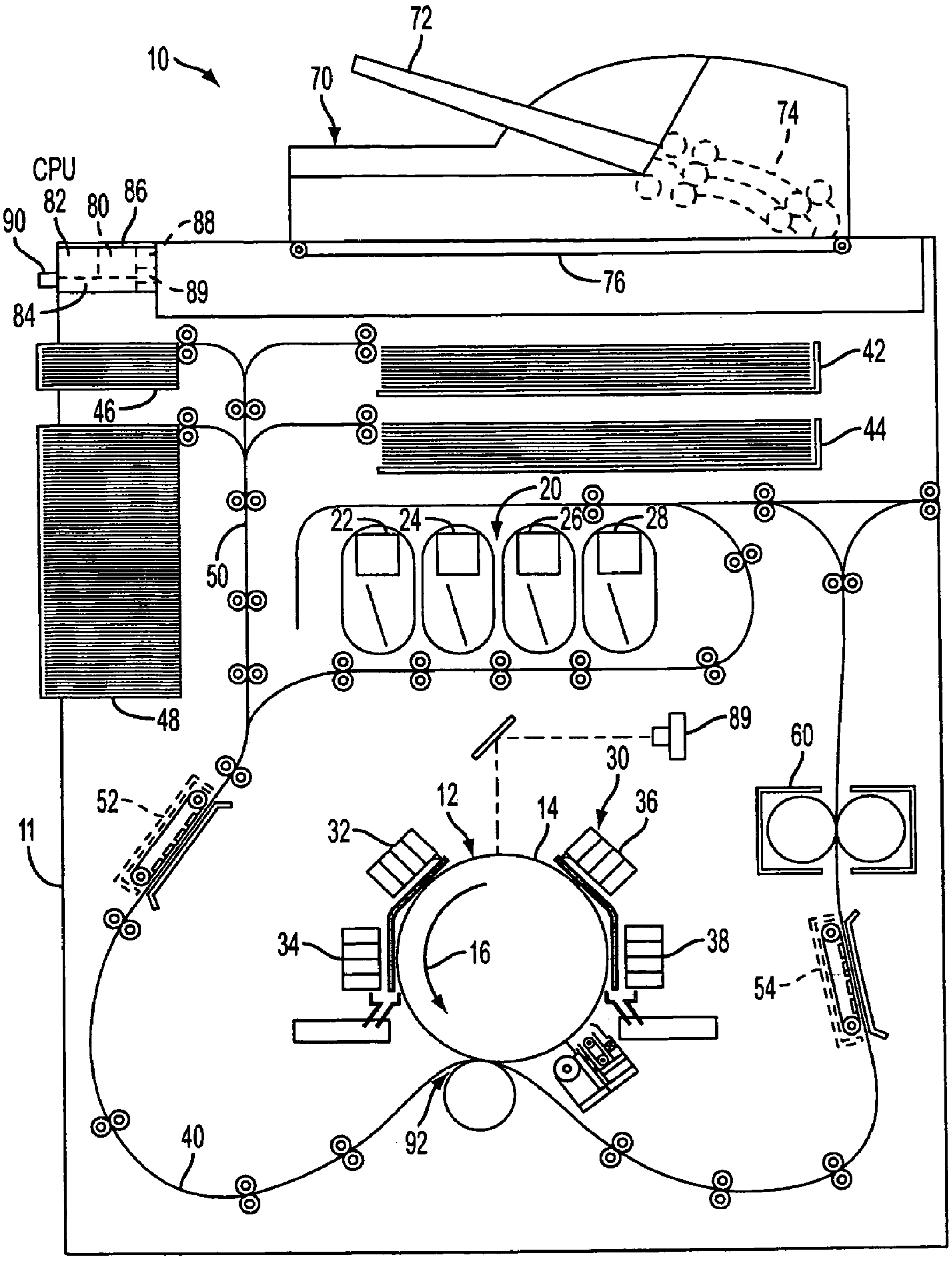
FIG. 1 is a schematic diagram of an exemplary phase change ink image producing machine.

FIG. 1 shows an exemplary phase change ink image producing machine 10, such as a photocopy machine, a single or multi-function printer, and the like. The machine 10 includes a frame 11 to which may be mounted, directly or indirectly all operating subsystems and components. The phase change ink image producing machine or printer 10 includes an imaging member 12 that may be in a form of a drum, an endless belt or the like. The imaging member 12 may have an imaging surface 14 that may be movable in the direction 16, and on which phase change ink images may be formed.

The phase change ink image producing machine 10 may also include a phase change ink system 20 that may have at least one source 22 of one color phase change ink in solid form. As the phase change ink image producing machine 10 may be a multicolor image producing machine, the ink system 20 may include, for example, four sources 22, 24, 26, 28, representing four different colors CYMK (cyan, yellow, magenta, black) of phase change inks. The phase change ink system 20 may also include a phase change ink melting and control assembly 100 (see FIG. 2) for melting or phase-changing the solid form of the phase change ink into a liquid form. The phase change ink melting and control assembly 100 may control and supply the molten liquid form of the ink toward a printhead system 30 including at least one printhead assembly 32. Since the phase change ink image producing machine 10 may be a high-speed, or high-throughput, multicolor image producing machine, the printhead system may include, for example, four separate printhead assemblies 32, 34, 36 and 38 as shown in FIG. 1.

The phase change ink image producing machine 10 may include a substrate supply and handling system 40. The substrate supply and handling system 40, for example, may include substrate supply sources 42, 44, 46, 48, of which supply source 48, for example, may be a high capacity paper supply or feeder for storing and supplying image receiving substrates in the form of cut sheets, for example. The substrate supply and handling system 40 may include a substrate handling and treatment system 50 that may have a substrate pre-heater 52, substrate and image heater 54, and a fusing device 60. The phase change ink image producing machine 10 may also include an original document feeder 70 that has a document holding tray 72, document sheet feeding and retrieval devices 74, and a document exposure and scanning system 76.

Operation and control of the various subsystems, components and functions of the machine 10 may be performed with the aid of a controller or electronic subsystem (ESS) 80. The controller 80, for example, may be a self-contained, dedicated mini-computer having a central processor unit (CPU) 82, electronic storage 84, and a display or user interface (UI) 86. The controller 80, for example, may include sensor input and control means 88 as well as a pixel placement and control means 89. In addition, the CPU 82 may read, capture, prepare and manage the image data flow between image input sources such as the scanning system 76, or an online or a work station connection 90, and the printhead assemblies 32, 34, 36, 38. As such, the controller 80 may be the main multi-tasking processor for operating and controlling all of the other machine subsystems and functions, including the machine's printing operations.

In operation, image data for an image to be produced may be sent to the controller 80 from either the scanning system 76 or via the online or work station connection 90 for processing and output to the printhead assemblies 32, 34, 36, 38. Additionally, the controller 80 may determine and/or accept related subsystem and component controls, for example, from operator inputs via the user interface 86, and accordingly may execute such controls. As a result, appropriate color solid forms of phase change ink may be melted and delivered to the printhead assemblies. Additionally, pixel placement control may be exercised relative to the imaging surface 14 thus forming desired images per such image data, and receiving substrates may be supplied from one or more of the sources 42, 44, 46, 48 and handled by means 50 in timed registration with image formation on the surface 14.

Finally, the image may be transferred within the transfer nip 92 from the surface 14 onto the receiving substrate for subsequent fusing at fusing device 60.

Figure 2:
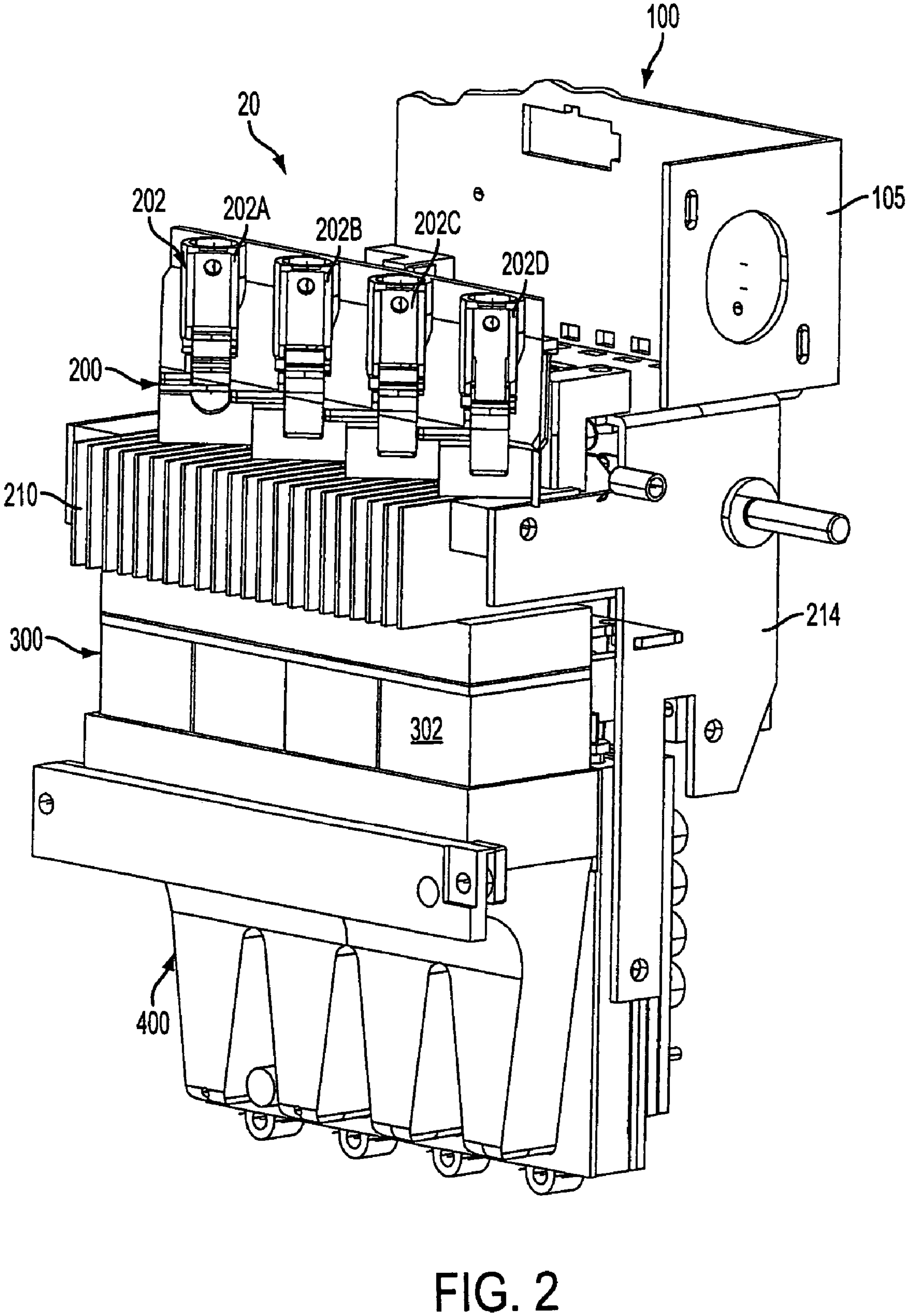
FIG. 2 is a perspective view of an exemplary phase change ink melting and control assembly.

Referring to FIG. 2, the phase change ink melting and control assembly 100 may be connected to the ink system 20 as illustrated. The phase change ink melting and control assembly 100 may include a melter assembly 300 for melting or phase changing solid pieces of phase change ink to form molten liquid ink. It may also include a molten liquid ink storage and supply assembly 400 that may be located below a melter housing 302 of the melter assembly 300. The phase change ink melting and control assembly 100 may include the pre-melter assembly 200 for controllably containing, conditioning and feeding solid pieces of phase change ink from the solid ink sources 22, 24, 26, 28 of the ink system 20.

The pre-melter assembly 200 may include a cooling device 210 mounted in heat exchange relationship with the second feeding apparatus 206 for maintaining a temperature of the solid pieces of phase change ink below a melting point temperature of the solid pieces of phase change ink, thereby preventing premature melting of the solid pieces of phase change ink before the solid pieces reach the melter housing 302.

A first feeding apparatus 202 may include four tubes 202A, 202B, 202C, 202D, one for each color CYMK of ink. The heat sink or heat exchanger 210 may ensure that the solid ink pieces of phase change ink do not pre-maturely melt, for example, by keeping the surface temperature of the solid ink pieces at about 60° C., for example, below their melting temperature, for example, of 110° C. The melter assembly 300, as well as the molten liquid ink storage and control assembly 400, which may all be located below the pre-melter assembly 200, may penetrate and convect heat vertically at 120° C., for example.

Figure 3:
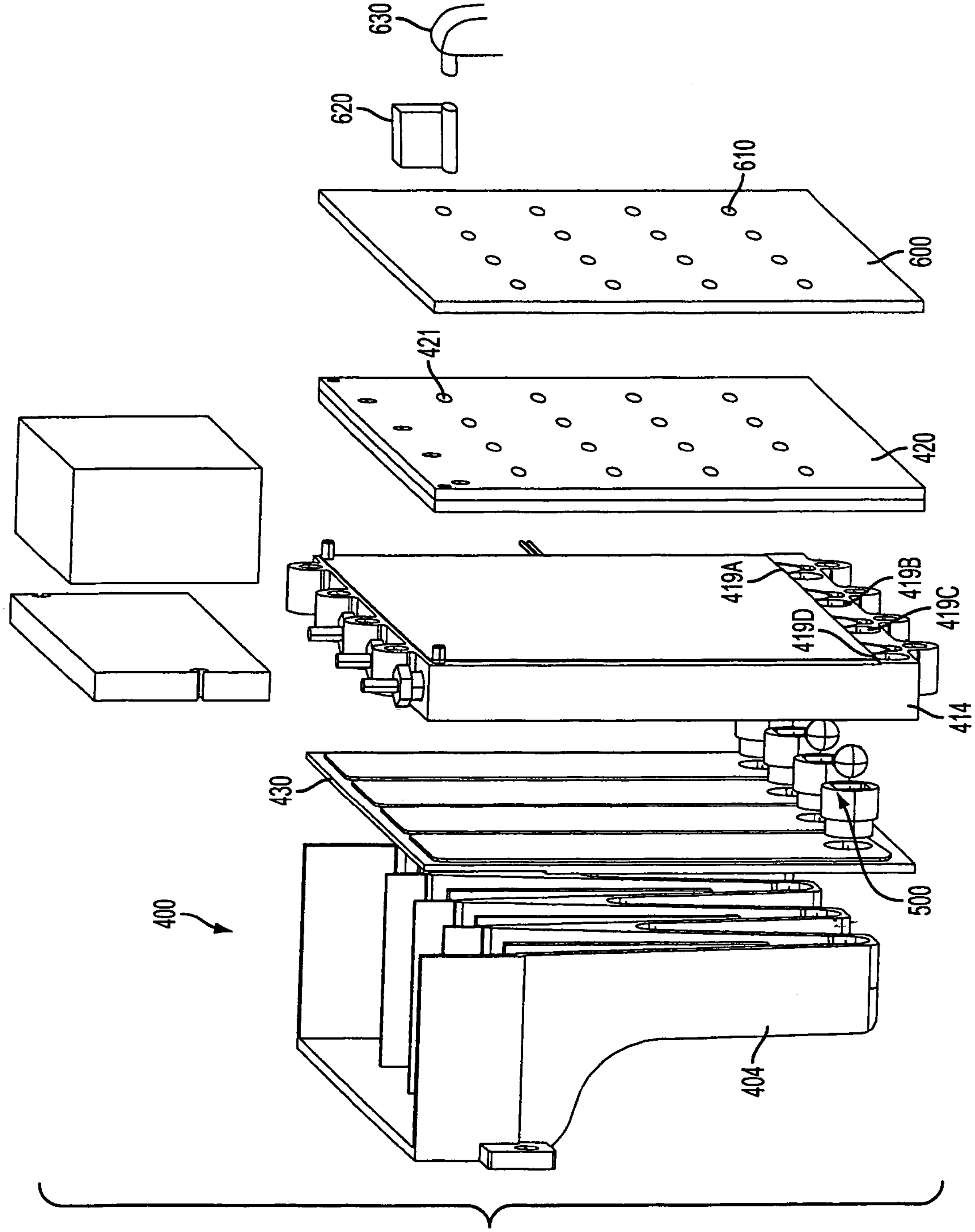
FIG. 3 is a perspective expanded view of the rear side of the exemplary phase change ink melting and control assembly attached with a valve system according to an exemplary embodiment.

As shown in FIG. 3, a first storage reservoir 404, which may be a low pressure reservoir (LPR), may be located directly below the melter assembly 300 and may gravitationally receive melted molten liquid ink from the melter assembly 300. The first storage reservoir 404 may have a storage capacity of about 14 grams per color (CYMK) of molten solid ink.

A check valve device 500 may be located at a bottom portion of a back plate 430 through a second storage reservoir 414, which may be a high pressure (HPR). The molten liquid ink thus may flow gravitationally from the first storage reservoir 404 through the check valve device 500 into the second storage reservoir 414.

At the bottom portion of the second storage reservoir 414, discharge openings 419A, 419B, 419C, 419D (one for each color ink CYMK) may be provided for molten liquid ink flow into a filter assembly (not shown) and successively a manifold plate 420 having a plurality of discharge ports 421. For example, there may be four discharge ports for each color, and therefore, there may be a total of 16 discharge ports. As the molten ink flows through the manifold plate 420 and is discharged through the discharge ports 421, the molten ink may flow into a valve plate 600. The valve plate may include a plurality of valve ports 610. The number of the valve ports 610 may be the same as the number of discharge ports 421. To each of the valve port 610, a valve 620 may be provided to regulate flow of the molten ink to an umbilical connecter 630. As the flow of ink is regulated by the valve 620, the ink may flow toward the printhead system 30 through the umbilical connector 630.

Figure 4:
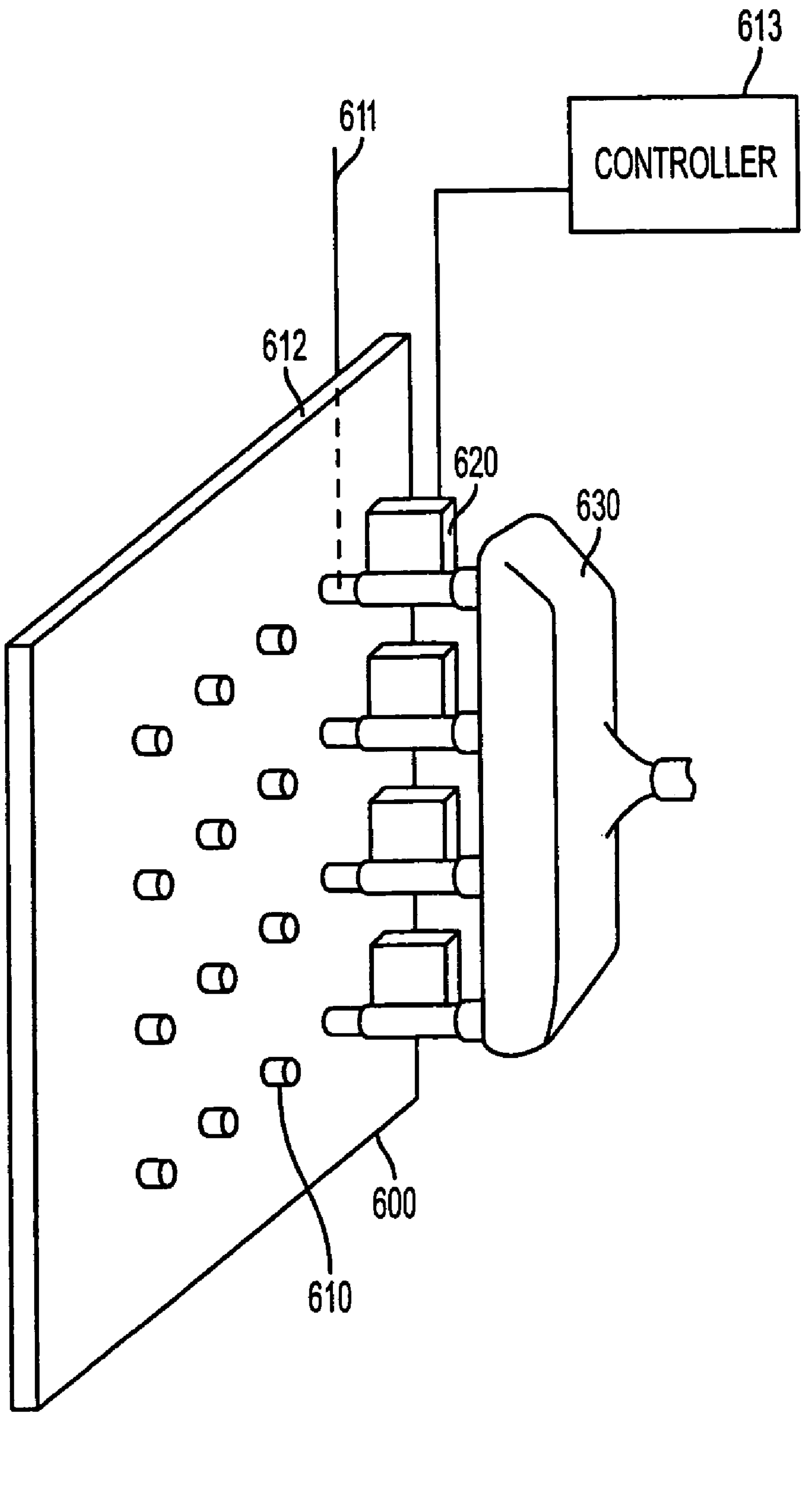
FIG. 4 is an exemplary valve system according to the first exemplary embodiment.
Figure 5:
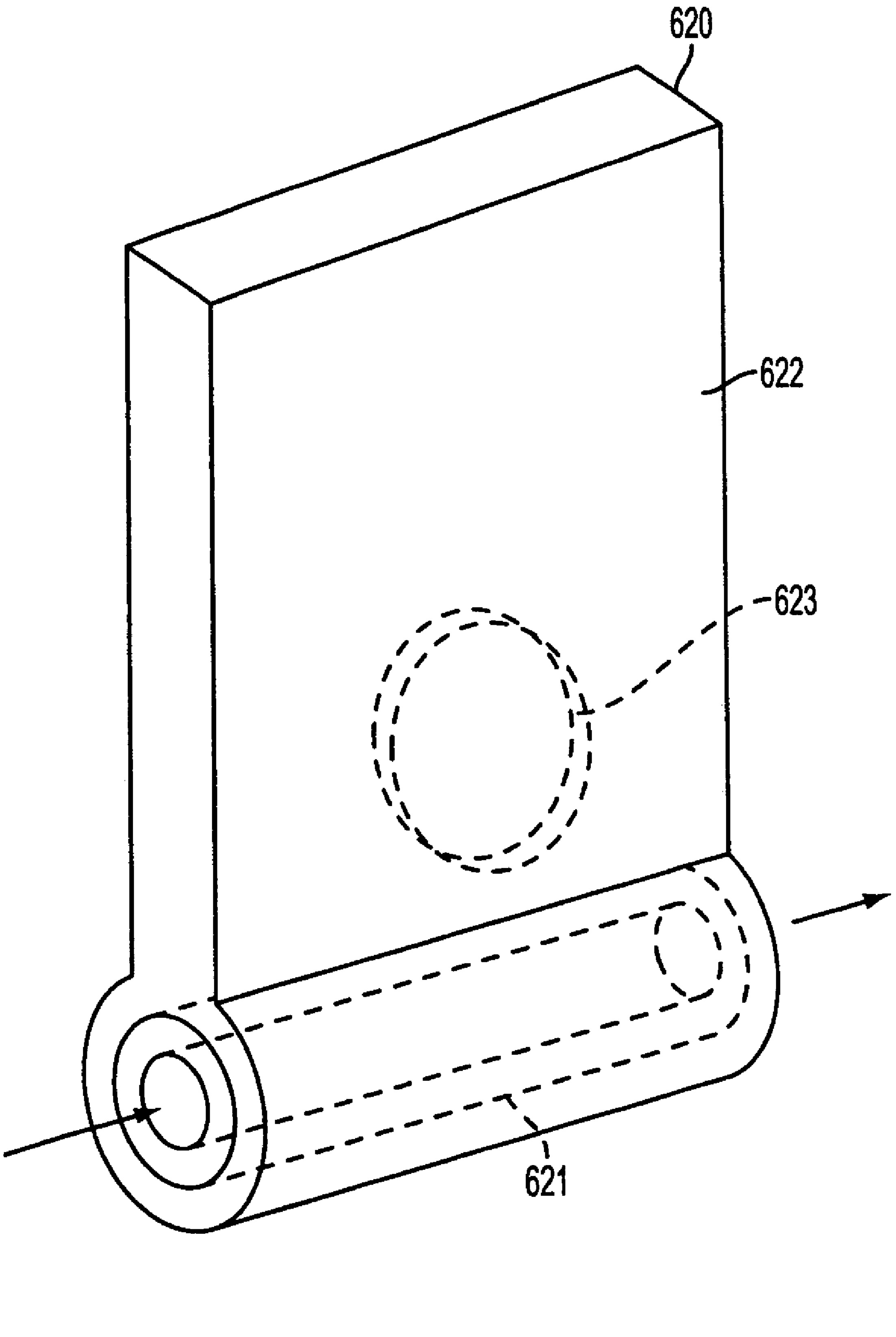
FIG. 5 is a perspective view of a valve according to the first exemplary embodiment.

An exemplary embodiment of a valve system is described below with reference to FIGS. 4 and 5.

An umbilical connector housing (not shown) may include a inlet and outlet for fan cooling and wires 611 that may be routed through the connector body 612 and to the valve 620. One valve 620 may be provided to each discharge port 610 and may include a tube 621, such as a silicon tubing rubber, through which the molten ink may flow. Each valve 620 may be provided with a heating element 623 that may be connected to the one or more of the wires 611 for heating and a cooling element, such as a fin 622, for cooling. As shown in FIG. 5, the heating element 623 may be provided within the cooling element 622. To more efficiently cool the tube 621, more than one fin 622 may be attached to the tube 621.

The heating element 623 may be a hi-density Ni-chrome foil, thermal electric peltier or PTC pill. The heating of the heating element 623 may be controlled by a controller 613. The tube 621 may be cooled by the fin 622. A large fin area with high airflow may produce a high convective heat transfer coefficient. A shape of a surface of the fin 622 may be changed to increase the surface area. Examples may include a heat sink and a wavy shape. The fin 622 may also be cooled electrically or chemically.

Compressed air may cool around each tube 621 using expansion of the air to remove heat from the tube 621. A compressed air cooler may require 40 to 80 psi, for example, to operate. Because the solid ink is thermo-sensitive, the ink may be melted by passing electric current through the wire 611 and the heating element 623 to increase tube temperature to a suitably high temperature, such as 120° C., and solidified by cooling the tube 621 by the fin 622 to a suitably low temperature, such as 65° C. Therefore, by melting and solidifying the ink in the tube 621 in the valve 620, the flow of the ink may be regulated.

Figure 6:
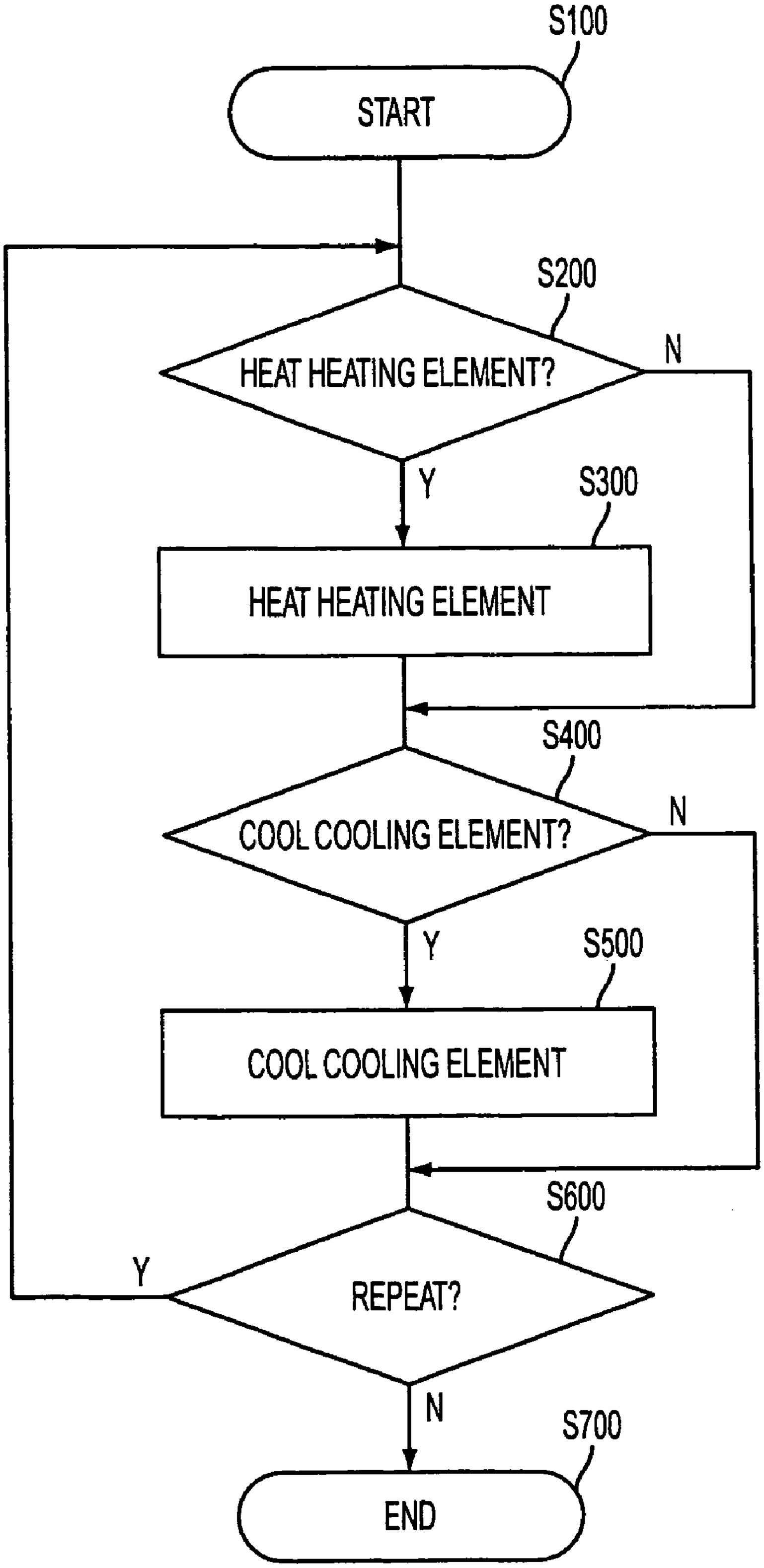
FIG. 6 is a flow chart explaining the control of the valve according to the first exemplary embodiment.

FIG. 6 is a flowchart showing exemplary control of the heating and cooling elements.

The process may start in step S100 and may continue to step S200. In step S200, a determination may be made as to whether the heating element needs to be heated. If so, the process may move to step S300. Otherwise, the process may jump to step S400. In step S300, the heating element may be heated. The process may continue to step S400.

In step S400, a determination may be made as to whether the cooling element needs to be cooled. If so, the process may continue to step S500. Otherwise, the process may jump to step S600. In step S600, the cooling element may be cooled by, for example, allowing airflow in the umbilical connector housing. The process may move to step S600.

In step S600, a determination may be made as to whether the process needs to be repeated. If so, the process may return to step S200. Otherwise, the process may end in step S700.

As described above, the valve 620 may be a separate unit from the valve plate 600 or the umbilical connector 630. However, the valve 620 may be directly mounted onto a silicon rubber tube that is pressed into the exit of the valve plate 600. An end of the tube may allow the silicon rubber tubing to be attached to an end of the umbilical connector 630. The cooling element 622 and the heating element 623 may be integrated on the valve plate 600.

Such a configuration of the exemplary embodiment was tested for various conditions. The first exemplary test was conducted under ambient temperature at 20° C. with an applied voltage of 10 volts. Fins with split and curved configuration were used at air velocity of 750 fpm. The umbilical connecter was heated to 120° C. As a result, it took 18 seconds to increase the temperature of the ink from 65° C. to 120° C. In addition, it took 39 seconds to decrease the temperature from 120° C. to 65° C. The temperature to release the ink was 117° C., and the time to increase the temperature from 65° C. to the release temperature was 16 seconds.

The second exemplary test was conducted under the ambient temperature at 20° C. with an applied voltage of 15 volts. Fins with split and curved configuration were used at air velocity of 750 fpm. The umbilical connecter was heated to 120° C. As a result, it took 14.5 seconds to increase the temperature of the ink from 65° C. to 120° C. In addition, it took 37 seconds to decrease the temperature from 120° C. to 65° C. The temperature to release the ink was 122° C., and the time to increase the temperature from 65° C. to the release temperature was 17 seconds.

Figure 7:
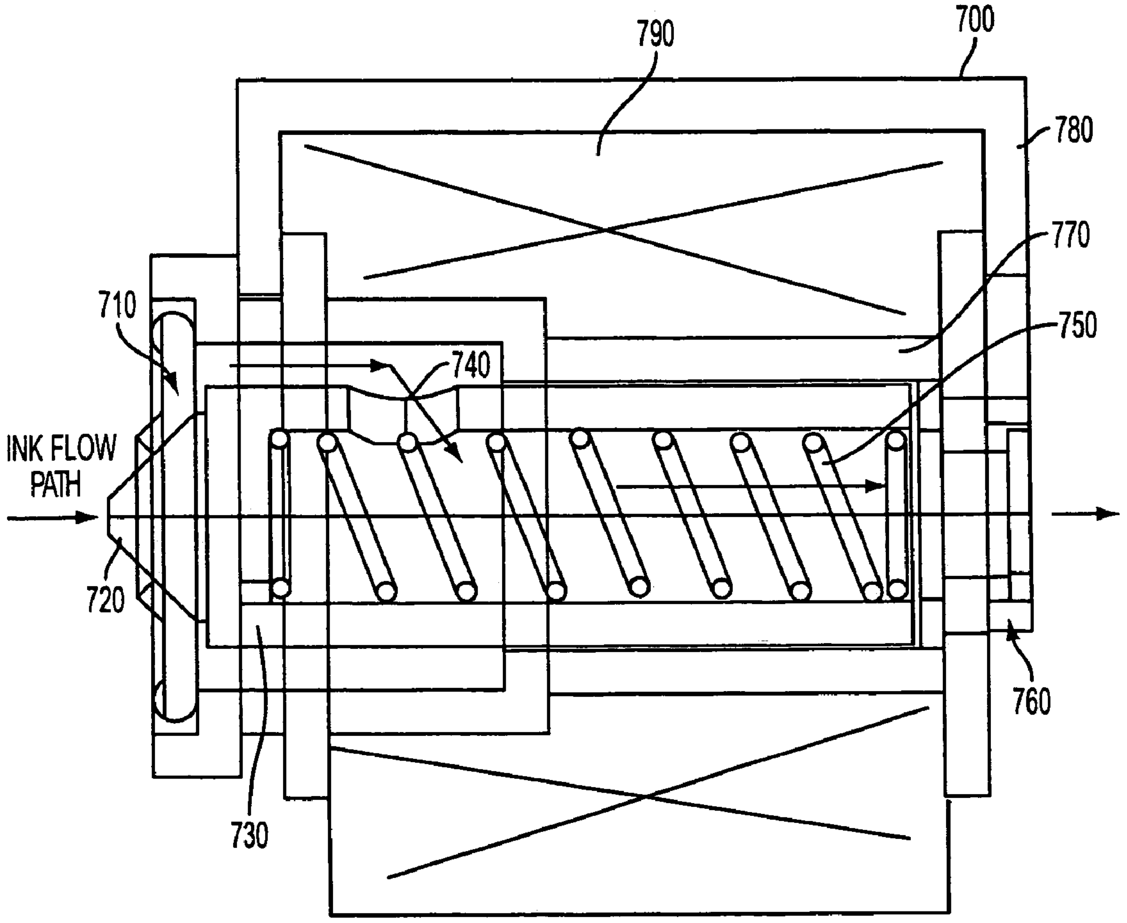
FIG. 7 is a schematic diagram of a valve according to the second exemplary embodiment.

FIG. 7 shows another exemplary embodiment of a valve system. A solenoid valve 700 may be structured from a tip sealing 710 provided on one side of the valve plate 600. The tip sealing 710 may be made of Viton®. Radially inside the tip sealing 710, a needle 720 having a sloped surface may be fit to the tip sealing 710. The needle 720 may be made of 400-series stainless steel. The needle 720 may include a needle body 730, which may be cylindrical. On the needle body 730, there may be an opening 740 through which molten ink may enter from a space created between the tip sealing 710 and the needle 720 by an actuator and flow axially through the needle body 730 out the end of the solenoid assembly, in the direction indicated by arrows.

Inside the needle body 730, a high temperature wire 750 maybe provided. The high temperature wire 750 may keep the needle body 730 heated so that the ink flows more smoothly. The temperature of the high temperature wire 750 in operation may be maintained at 150° C., for example.

At the umbilical connector side of the needle body 730, there may be a Viton® seal 760 that is directly connected to the umbilical connector, to allow the ink to flow into the umbilical connector.

The needle body 730 maybe surrounded by a needle body housing 770 that may prevent the heat generated by the high temperature wire 750 from dissipating outside the needle body 730. The needle body housing 770 may be made of PPS high temperature plastic.

A space between the needle body housing 770 and a main housing 780 may be filled with a coil 790. Electric current may be passed through the coil 790, such that the needle 720 is attracted to move toward the umbilical connector thus opening a gap between the tip sealing 710 and the needle 720.

One hole 740 is shown in FIG. 7. However, it should be appreciated that more than one hole may be provided, for example, one on the top side and the other one on the bottom side of FIG. 7, to make the ink to flow more efficiently.

Figure 8:
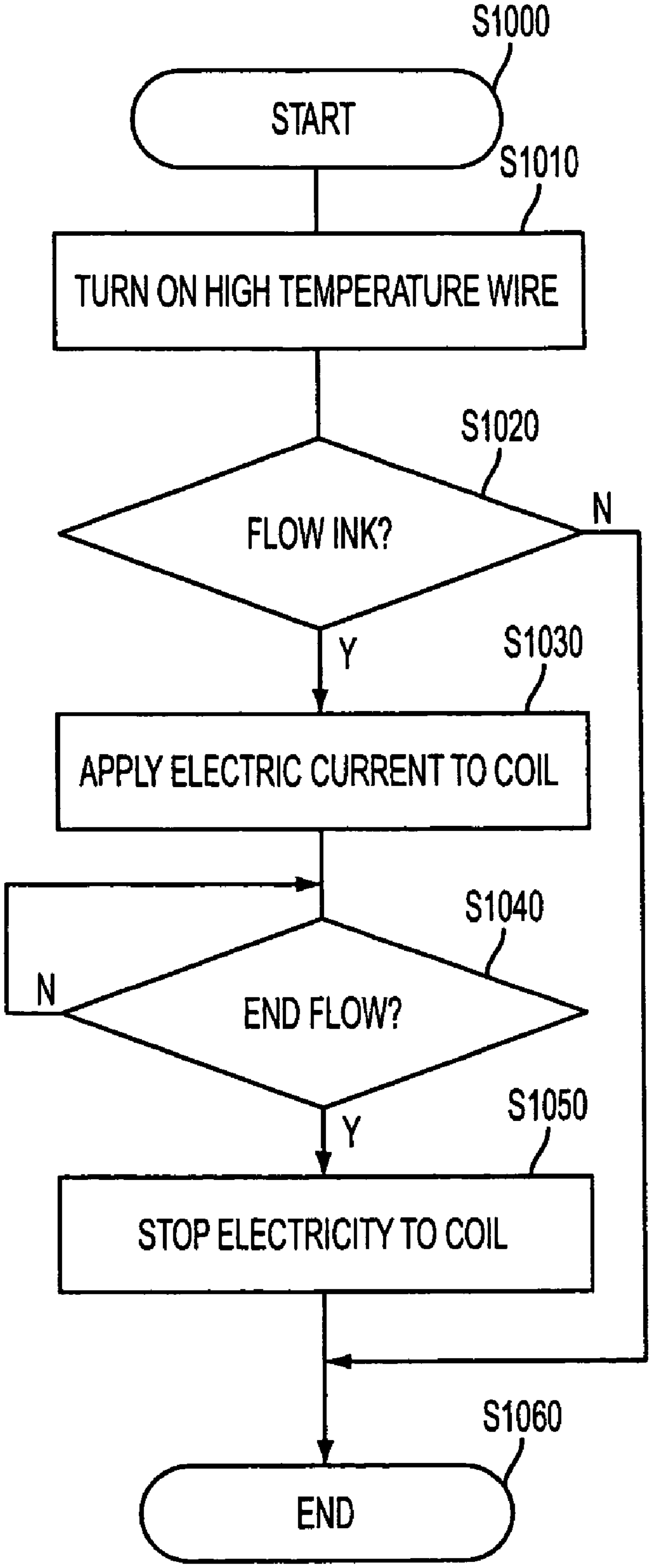
FIG. 8 is a flow chart explaining the control of the valve according to the second exemplary embodiment.

FIG. 8 shows a flowchart illustrating an exemplary process of controlling the valve of FIG. 7.

The process may start at S1000 and may continue to step S1010. In step S1010, the high temperature wire may be turned on. In step S1020, a determination may be made as to whether the ink should flow. If not, then the process may jump to step S1060 and may end. Otherwise, the process may continue to step S1030. In step S1030, electric current may be passed through the coil so that the needle is attracted to create a space between the tip and the tip seal. In step S1040, a determination may be made as to whether the flow should be stopped. If not, the process may repeat step S1040. Otherwise, the process may move to step S1050. In step S1050, the passing of the electricity to the coil may be terminated. The process may end in step S1050.

Figure 9:
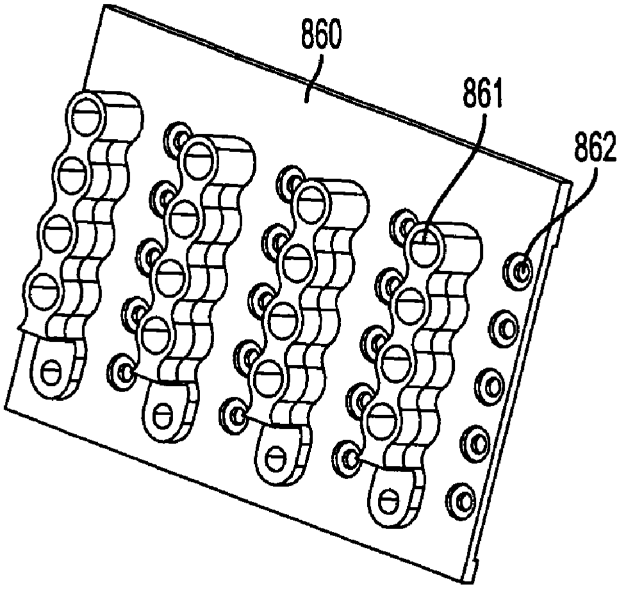
FIG. 9 is a front side of a valve plate of a valve according to the third embodiment.
Figure 10:
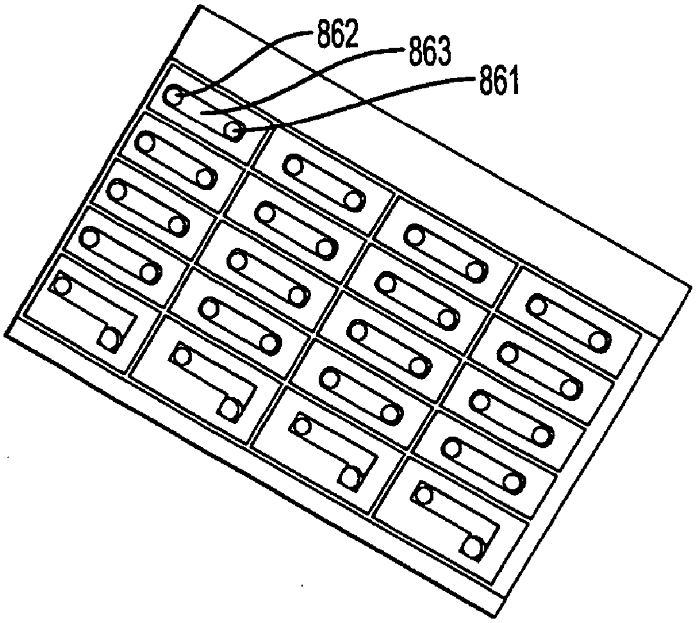
FIG. 10 is a back side of the valve plate of the valve according to the third embodiment.
Figure 11:
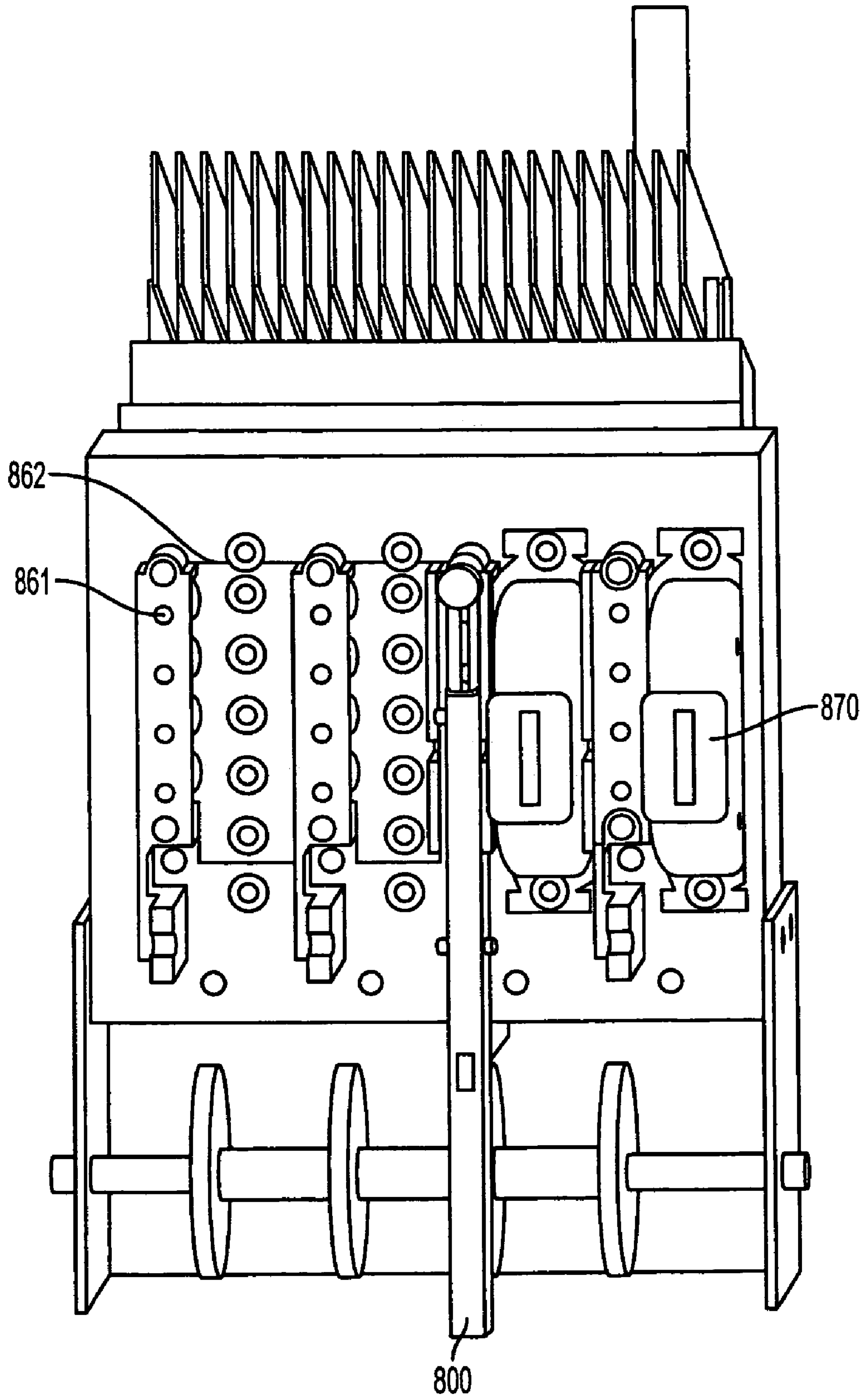
FIG. 11 is a rear side of the third exemplary phase change ink melting and control assembly attached with a valve system according to the third exemplary embodiment.

FIGS. 9-14 show another exemplary embodiment of a valve system 800. FIG. 9 shows a front side of a valve plate 860, and FIG. 11 shows a back side of the valve plate 860. The valve plate 860 may include two ports, a first port 861 and a second port 862 for each discharge port. Therefore, if there are 16 discharge ports (for example, four ports for each of four colors), there are 16 first ports and 16 second ports. As shown in FIG. 10, the first port 861 and the second port 862 may be connected by a ink distribution channel 863 on the back side of the valve plate 860. The discharge ports 421 may be located such that each discharge port 421 is located to correspond to the respective one of the first port 861.

As shown in FIG. 11, the first ports 861 may communicate with a discharge port 421, and the second ports 862 may communicate with an umbilical connector 870 that sends the molten ink to the printhead (not shown).

Accordingly, when the first port 861 is opened by the valve system 800, ink that is discharged from each discharge port 421 may flow into the first port 861, may be ejected from the second port 862 after flowing through the ink distribution channel 863, and may flow into the umbilical connector 870.

Figure 12:
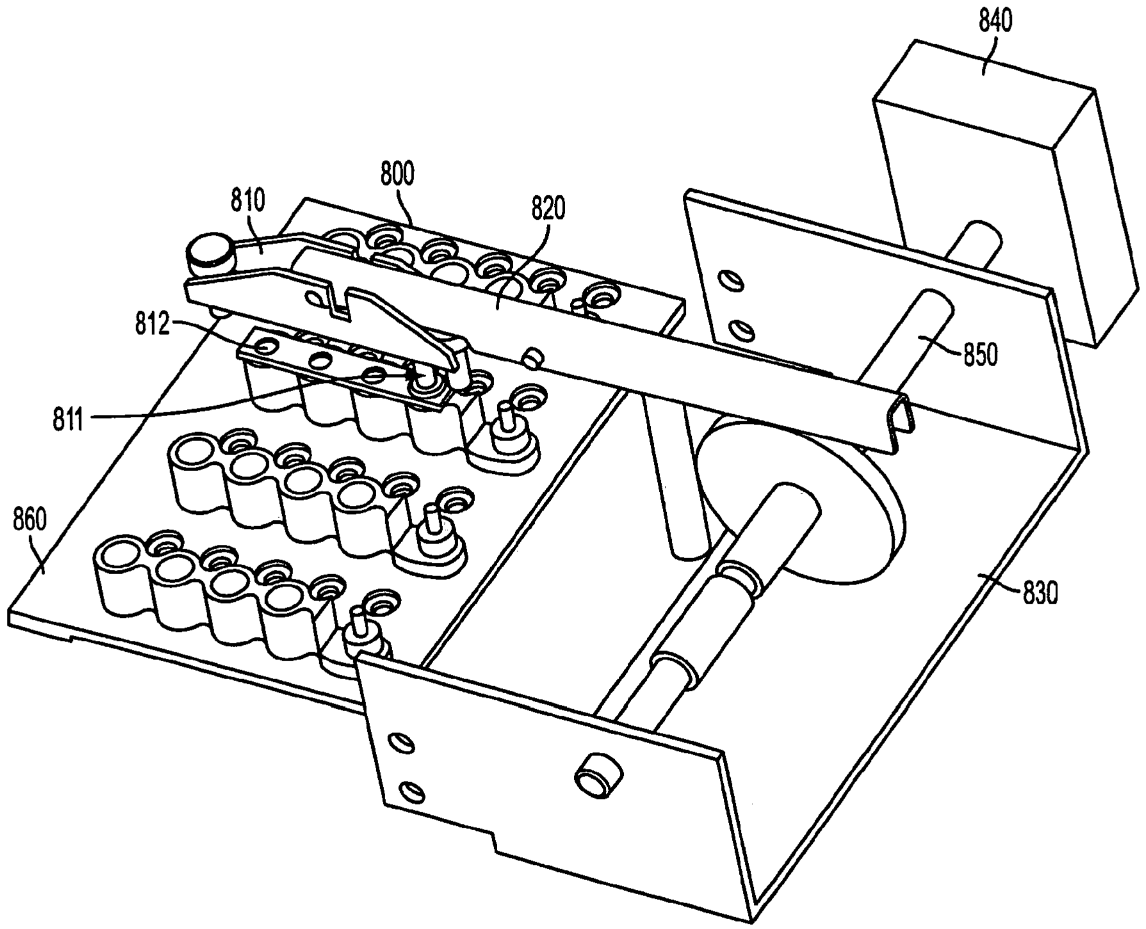
FIG. 12 is a perspective view of the valve system according to the third exemplary embodiment.
Figure 13:
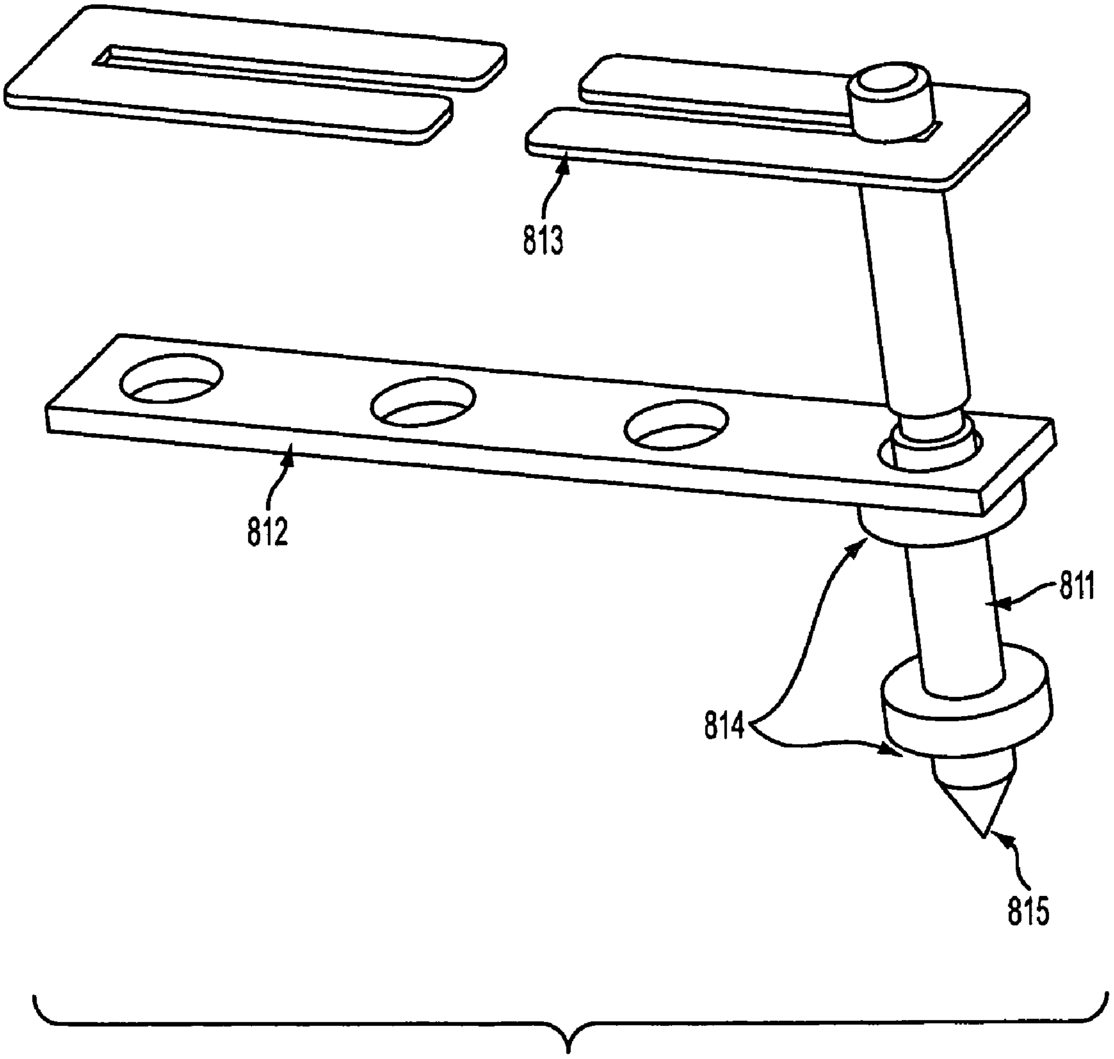
FIG. 13 is a perspective view of a valve element and a retainer of the valve according to the third exemplary embodiment.

As shown in FIG. 12, the valve system 800 may include a lift lever 810, a cam lever 820, and a cam 830. The lift lever 810 may include one or more valve elements 811 and a bracket 812. The number of the valve elements may correspond to the number of first ports 861 for a single color. In the exemplary embodiment shown, because there are four first ports 861 for each of the four colors, there are four valve elements 811 attached to the lift lever 810. Each valve element 811 may be attached to the lift lever 810 by a retainer 813, for example, as shown in FIG. 13.

Each valve element 811 may be inserted through an opening of the bracket 812. The valve element 811 may be fixed to the bracket 812 by seal rings 814. A tip end 815 of the valve element 811 may be pointed such that the tip end 815 closes the first port 861, for example, as shown in FIG. 12. The valve element 811 may be made of a stainless pin with a compression-molded conical Viton® tip. The valve elements 811 may be multiplexed so that one set of color valves opens in order so that within one cycle of the cam revolution, all four heads deliver ink as needed. The valve element 811 may be displaced 2.0 mm stroke, for example, to allow molten ink to flow to the umbilical connector 870.

The lift lever 810 may be attached to one end of the cam lever 820. The other end of the cam lever 820 may be pressed against the cam 830 by a spring or the like (not shown). The cam 830 may be driven by a motor 840 via a cam shaft 850. The motor 840 may be a single motor. Similar to the lift lever 810, the cam lever 820 and the cam 830 may be provided for each color. The cam 830 for each color may be provided on the same cam shaft 850, thereby having all of the cams 830 rotate together at the same rotational speed. When the cam 830 is rotated, the cam lever 820 may slide on the side surface of the cam 830. The cam lever 820 may thus move in a cantilever manner.

Figure 14:
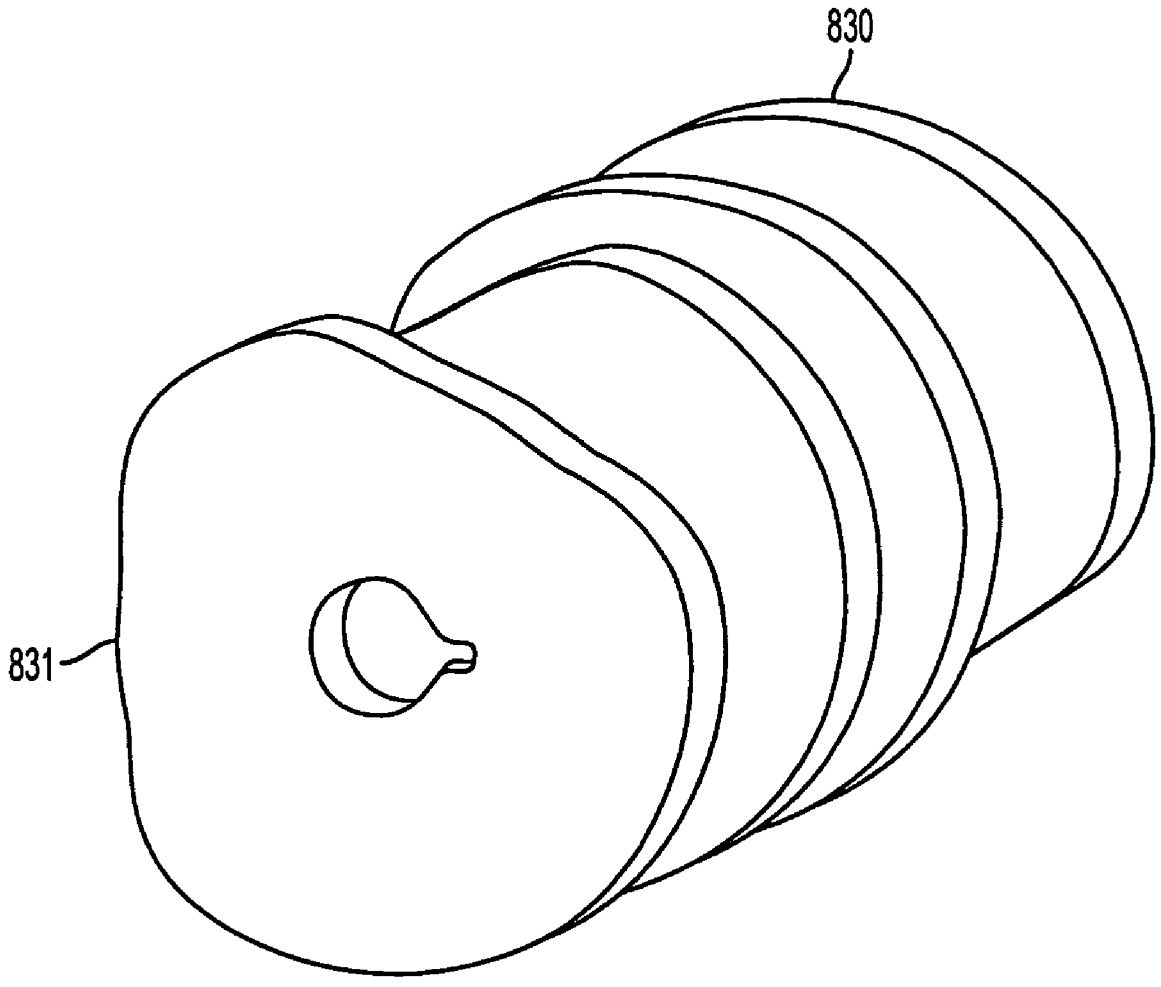
FIG. 14 is a perspective view of cams of the valve according to the third exemplary embodiment.

As shown in FIG. 14, each cam 830 may include one or more relatively flat surfaces 831. When the cam 830 rotates as the cam shaft 850 is rotated by the motor 840, the cam lever 820 may contact the flat surfaces 831. When the cam lever 820 contacts the flat surfaces, the cam-side end of the cam lever 820 may be lowered because the flat surface 831 is formed inwardly toward the cam shaft 850. Because the cam lever 820 is disposed in a cantilever manner, the lift-lever-side end of the cam lever 820 may be lifted as the cam-side end of the cam lever 820 is lowered. Therefore, Such flat surfaces 831 for one cam 830 may be radially offset from the flat surfaces 831 of other cams 830. Therefore, when all of the cams 830 are rotated together by the cam shaft 850, the cam levers 820 may move asynchronously.

Figure 15:
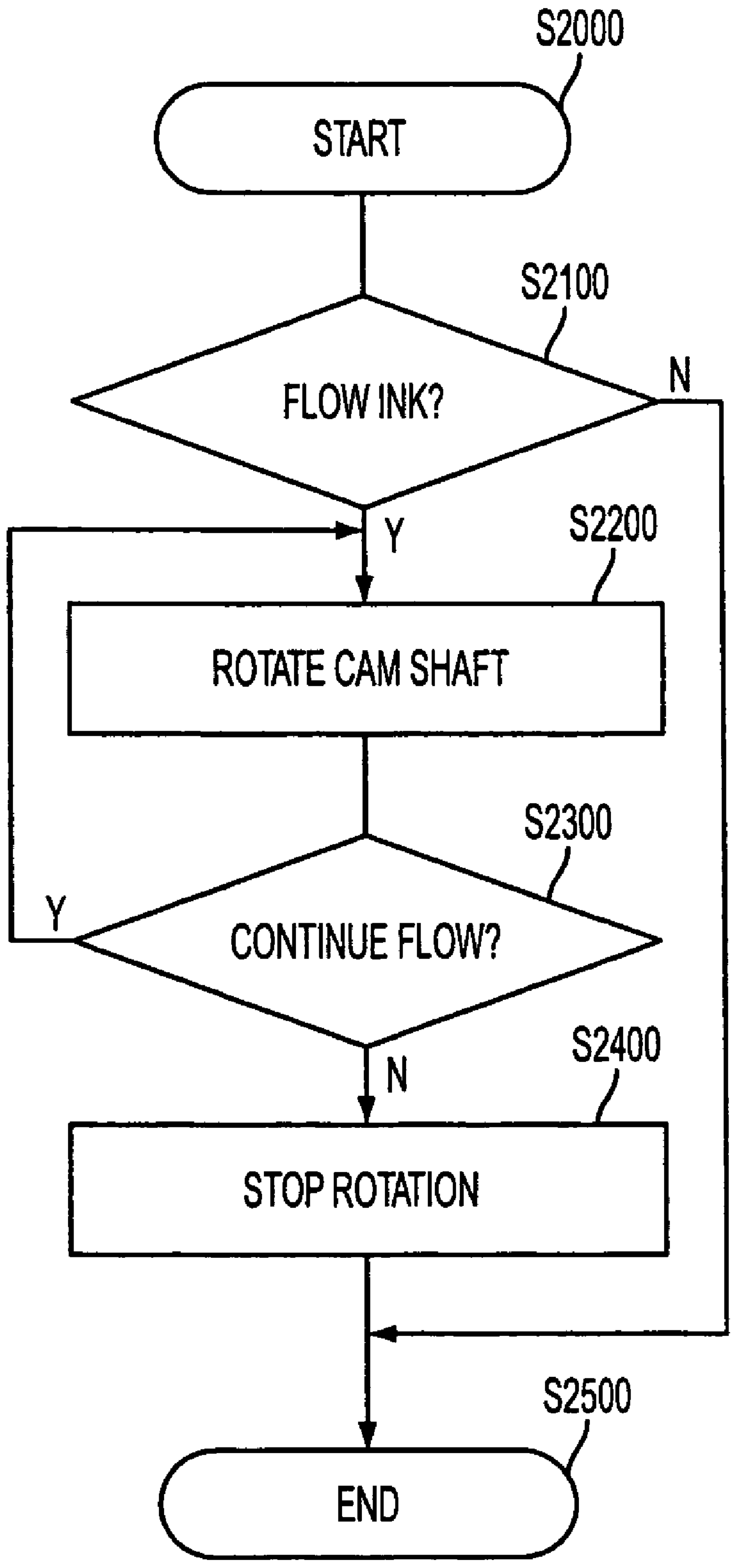
FIG. 15 is a flow chart explaining the control of the valve according to the third exemplary embodiment.

FIG. 15 shows a flowchart illustrating an exemplary method of controlling the valve system 800. The process may start in step S2000 and may continue to step S2100. In step S2100, a determination may be made as to whether molten ink should flow into the valve system 800. If so, the process may move to step S2200. Otherwise, the process may end in step S2500.

In step S2200, the cam shaft may be rotated by the motor. At this time, because there may be a plurality of cams on the cam shaft and because the relative flat surfaces of the cams may be radially offset from each other, the cam lever may move asynchronously as the sham shaft rotates. The process may continue to step S2300.

In step S2300, a determination may be made as to whether flow of the ink should be continued. If so, the process may return to step S2200 for further rotation of the cam shaft. If not, the process may move to step S2400. In step S2400, the rotation of the cam shaft may be stopped, and the process may end in step S2500.

Accordingly, as described above, flow of molten solid ink to the umbilical connector may be asynchronously regulated as desired.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A solid ink valve system, comprising:

a valve plate, the valve plate including at least one valve port;

an umbilical connector; and a valve positioned between the valve plate and the umbilical connector and connected to the at least one valve port, the valve being configured to asynchronously regulate ink flow between the valve plate and the umbilical connector, the valve being actuated independently of the ink flow, wherein the valve comprises:

a sealing on an input side of the valve and in contact with the at least one valve port;

a needle arranged to fit in the sealing to prevent passage of the solid ink and to create a space from the sealing when actuated, the needle including an opening and a wire therein, the space being placed in communication with the opening when the needle is actuated.

2. The valve system of claim 1, wherein the valve further comprises:

a coil surrounding the needle and configured to actuate the needle to create a space in the sealing for passage of the solid ink.

3. A xerographic device including the valve system according to claim 1.

4. A solid ink valve system, comprising:

a valve plate, the valve plate including at least one valve port;

an umbilical connector; and a valve positioned between the valve plate and the umbilical connector and connected to the at least one valve port, the valve being configured to asynchronously regulate ink flow between the valve plate and the umbilical connector, the valve being actuated independently of the ink flow, wherein the valve comprises:

at least one valve element;

a lift lever that retains the at least one valve element;

a cam lever connected to the lift lever and arranged to lift the lift lever; and a cam provided on a cam shaft and arranged to raise and lower the cam lever.

5. The valve system of claim 4, further comprising a motor arranged to actuate the cam shaft.

6. The valve system of claim 4, wherein the at least one valve port comprises at least four valve ports, and the at least one valve element comprises four valve elements, each valve element being provided on a retainer and a bracket that holds the valve element on the lift lever and being provided with seals configured to at least one of open and close a corresponding one of the at least four ports.

7. The valve system of claim 4, wherein the at least one valve port comprises at least four valve ports, and the valve is provided to each one of the at least four ports.

8. The valve system of claim 7, wherein the cam of each of the four valves is mounted on a same shaft.

9. The valve system of claim 8, wherein the cam of each of the four valves is actuated at different times such that each cam lever is asynchronously raised and lowered.

10. A method of regulating a flow of a solid ink, comprising:

providing at least one valve between a valve plate and an umbilical connector and in communication with at least one valve port of the valve plate;

actuating the at least one valve to asynchronously regulate flow of molten solid ink therethrough independently of ink flow, wherein actuating the at least one valve comprises rotating a cam to cause at least one valve element of the at least one valve to at least one of open and close at least one valve port.

11. The method according to claim 10, further comprising:

providing at least four valve elements and at least four valve ports, each of the at least four valve elements being associated with a respective one of the at least four valve ports; and actuating the at least four valve elements asynchronously.

* * * * *